United States Patent Office 2,937,924
Patented May 24, 1960

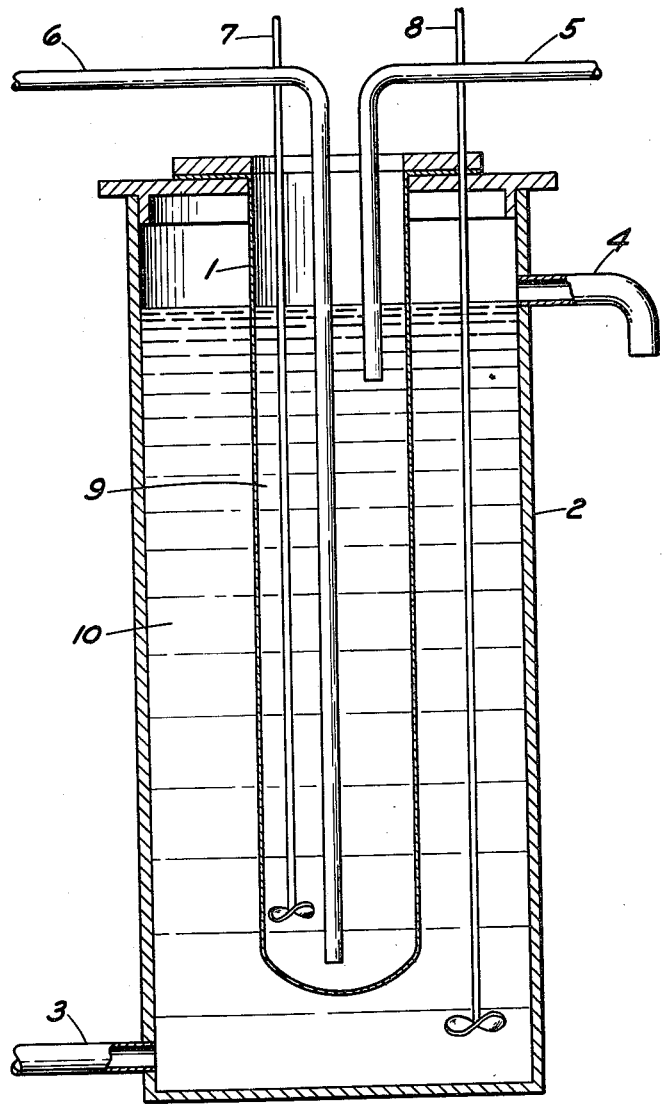

2,937,924

SEPARATION OF PLUTONIUM FROM FISSION PRODUCTS BY A COLLOID REMOVAL PROCESS

Jack Schubert, Chicago, Ill., assignor to the United States of America as represented by the United States Atomic Energy Commission Filed Sept. 13, 1949, Ser. No. 115,571

12 Claims. (Cl. 23—14.5)

The present invention relates in general to a process for the decontamination of transuranic element 94 known as plutonium, and more particularly to a process for the removal from plutonium solutions of certain contaminating materials, especially the fission product species zirconium, columbium, barium, and lanthanum, by virtue of their discovered radiocolloidal nature.

As is known, plutonium is conventionally produced by neutron irradiation of uranium. Customarily, plutonium is so produced by effecting a neutron-induced chain fission reaction of natural uranium in a self-sustaining nuclear reactor. The reaction is ordinarily terminated upon obtaining a plutonium content within the range of about 0.0001% to 0.02% of the irradiated uranium mass, at which time the mass is stored for a period to permit radioactive decay, and then subjected to plutonium recovery processing. In addition to producing plutonium, the reaction results in the formation of an approximately equal weight of fission products in various relative amounts. The fission products, which are highly radioactive, comprise elements possessing atomic numbers ranging predominantly from 30 to 63. Although the fission products thusly associated with plutonium are ordinarily present in relatively small amounts, they continue to exhibit intense radioactive properties long after neutron irradiation has been terminated. Because this radioactivity is, in general, deleterious both from physiological and technical standpoints, it is usually necessary, in order to successfully utilize plutonium, to separate it from the fission products.

Conventional procedures employed in the exceedingly difficult task of effecting the separation and isolation of plutonium from a solution of neutron-irradiated uranium involve precipitation therein, under controlled conditions, of carriers such as bismuth phosphate, lanthanum fluoride, and the like. These processes are the invention of others, and details thereof are described in co-pending applications, as for example, application Ser. No. 519,714, filed January 26, 1944, and now Patent No. 2,785,951, granted March 19, 1957. As set forth in said Ser. No. 519,714, one such process is based on the fact that plutonium is characterized in its tetravalent oxidation state by forming an insoluble phosphate, and in its hexavalent state by forming a soluble phosphate. In the particular process, bismuth phosphate is precipitated in an aqueous nitric acid solution of neutron-irradiated uranium containing tetravalent plutonium, whence plutonium is co-precipitated, leaving behind in solution a substantial portion of fission products and other sources of contamination; such operation is termed "product precipitation." The carrier precipitate containing plutonium is then separated from the supernatant, dissolved, and the plutonium oxidized to the hexavalent state. After so preparing the solution, bismuth phosphate is precipitated therein, ordinarily carrying down a substantial portion of the fission products and other contaminants and leaving a preponderant portion of the plutonium in solution; such operation is termed "by-product precipitation." The by-product precipitate is then removed, leaving the supernatant solution containing the bulk of the original plutonium, in condition susceptible to further plutonium purification operations. This cycle comprising product precipitation followed by by-product precipitation is conventionally repeated numerous times until sufficient plutonium decontamination is effected. Other carrier precipitates, for example lanthanum fluoride, are employed in a similar manner to afford preferential separation of plutonium from contaminants.

While such purification procedures ultimately produce substantially pure plutonium, their efficiency could desirably be much higher. The necessity for the numerous repetitions results from the fact that in both the product and by-product precipitations a considerable portion of the contaminants, especially gamma radiation emitters, ordinarily accompany the plutonium, precipitating with plutonium in the former precipitation and remaining in the supernatant in the latter. Unfortunately, however, with each repetition of a purification cycle for the purpose of further partial removal of the accompanying contamination, an increment of plutonium is removed with the separated contaminant fraction. As a consequence, even after extensive recycling and reprocessing of by-product fractions for plutonium recovery, relatively large amounts of valuable plutonium must finally be discarded with contaminant wastes. Therefore it has been highly desired in this particular art that beneficial supplemental procedures be provided in order to more quickly and thoroughly reduce or eliminate contamination of plutonium.

The present invention has for one object to provide a process for the removal of contaminants, such as fission products, from aqueous plutonium solutions.

Another object is to provide such a process which, when effected in combination with plutonium decontamination steps already known or practiced, results in a reduction in the number of purification cycles required for satisfactory decontamination or in a higher degree of decontamination with the same number of cycles.

A further object is to provide a process for the separation, concentration, and recovery of individual radioactive species, such as species occurring as uranium fission products, dispersed in aqueous media.

Other objects will become apparent hereinafter.

While it had not previously been regarded that the fission products ordinarily associated with plutonium in a solution of neutron-irradiated uranium were present in other than ionic form, applicant has made the discovery that a substantial portion of the fission product contamination may be removed from such a solution by simply subjecting the solution to a colloid removal process, such as dialysis, ultrafiltration, or ultracentrifugation. From investigation of this phenomenon it has become evident that certain fission products, primarily gamma emitters, especially radiocolumbium, radiozirconium, radiolanthanum, and radiobarium, unsuspectedly exhibit a propensity for existing in radiocolloidal form in aqueous media. It has been found that plutonium on the other hand, generally does not exhibit such a propensity under the conditions employed in conventional plutonium decontamination processes. Consequently, this propitious circumstance affords a new plutonium decontamination process wherein contaminating fission products are removed from dissolved ionic plutonium by virtue of their discovered radiocolloidality.

It is therefore in accordance with the present invention to employ in a process for the separation and recovery of plutonium values from an aqueous liquid containing plutonium predominantly in ionic form and having uranium fission products dispersed therein, the step of subjecting said liquid to a process for separating and removing suspended colloidal material from the liquid medium, thereby separating and removing contaminating fission products, as radiocolloids, from the plutonium-containing solution.

Virtually any conventional colloid removal technique may be employed for radiocolloid fission product removal in conducting the present process. Such techniques as dialysis, ultracentrifugation, and ultrafiltration have proven to be amply efficacious for the purpose. In effecting dialysis in accordance with this invention, the plutonium-containing liquid to be treated is disposed adjacent to a second solution and separated therefrom by a semi-permeable membrane. Such a membrane comprises a thin, porous barrier having pore size of such magnitude as to permit the diffusion of ions therethrough but to effectively restrain like diffusion of colloidal particles, which are characteristically much larger than ions. A bilaterial diffusion through the membrane of substantially only ions results, whereby plutonium ions diffuse into the said second solution to the effective exclusion of colloidal material.

The accompanying drawing diagrammatically illustrates a system which may be utilized for subjecting solutions to dialysis in the practice of the present invention. Referring to the drawing, a semi-permeable membrane 1 forming a bag open only at the top is supported within a tank 2. The tank 2 is provided with a liquid inlet 3 and a liquid outlet overflow 4. Likewise the bag formed by the membrane 1 is provided with a liquid inlet tube 5, and a liquid withdrawal tube 6. Mechanical stirring means 7, 8, respectively, are provided both inside the bag 1 and in the tank 2. In operation, an aqueous liquid 9, containing plutonium in predominantly ionic form and certain contaminants in the form of a radiocolloidal suspension, is introduced into the membrane bag 1, and the tank containing the membrane is filled with a suitable aqueous solution 10. Plutonium ions thereupon dialyze through the pores of the membrane out into the aqueous solution in the tank, while colloidal particles of contaminant are prevented from doing so because of their larger size. The operation of the stirring means 7, 8, increases the rate of dialysis, accelerating the approach toward physical reaction equilibrium. Upon the completion of the operation, the solution 10 outside the membrane bag contains dialyzed ionic plutonium, while colloidal constituents are retained within the confines of the membrane bag.

It is advantageous for the aqueous solution 10 provided for accepting the dialyzed plutonium ions to be substantially identical in composition with the medium in which the plutonium and fission products are dispersed. For example, when the medium containing plutonium and dispersed colloidal fission products is an aqueous, acidic uranyl nitrate solution, the said solution for accepting dialyzed plutonium is beneficially likewise an aqueous uranyl nitrate solution of substantially the same concentration and acidity. For the present application it has been found preferable to use for the semi-permeable membrane materials such as parchment, cellulose film, and collodion. However a membrane of any of the various suitable materials conventionally employed in dialysis, having pore diameters such that ions can diffuse therethrough to the restriction of particles of colloidal size, may satisfactorily be used. It has been found beneficial to employ membranes having pore diameters of approximately 30 to 40 Angstrom units, and of material which does not suffer excessive deleterious effects upon contact with the solutions being dialyzed.

While the dialysis may be effected with the liquids stationarily disposed in the apparatus, it has been found desirable for most practical applications to employ a flowing stream of solution 10 to gain the advantage of a greater ionic concentration differential across the membrane. This is desirable because generally the maximum concentration of plutonium that may be obtained in solution 10 is that which renders equal the plutonium concentrations on both sides of the membrane. Ordinarily, with stationary liquids, the volume of tank 2 should be considerably greater than that of bag 1 in order that upon equalizing the plutonium concentrations, most of the plutonium will be outside of the membrane. However, if a slowly flowing stream of liquid 10 is employed, the volume of tank 2 need be no more than slightly larger than the bag 1. For industrial application it has been found beneficial to employ a series of dialysis chambers, as the one illustrated, utilizing a continuous counter-current flow of both liquids through the series. Solution 10 overflows through outlet 4 of one chamber and is passed into the inlet 3 of the next chamber. Colloid, containing liquid 9 is passed from one membrane bag to the next in the opposite direction; liquid 9 is withdrawn through withdrawal tube 6 of one chamber and passed into the inlet tube 5 of the next lower chamber. By this manner the fresh solution 10 encounters the least concentrated plutonium in the liquid 9 in the first chamber and thus is most effective in stripping the plutonium remaining therein. At the other end of the series, the solution 10 encounters the highest concentration of plutonium in the liquid 9, and thus contains a maximum of recovered plutonium upon leaving the cycle.

Ultrafiltration may be effected to remove the radiocolloidal constituents from solution, using apparatus similar to that described for dialysis. A semi-permeable membrane forming a sac is suspended within the upper portion of a closed tank wherein a partial vacuum is maintained by a vacuum pump. A solution introduction tube communicates from within the sac to the outside of the tank. Upon introducing the plutonium-containing liquid to be treated through the tube into the sac, a vacuum ultrafiltration is effected wherein the bulk of the aqueous plutonium solution is drawn through the semi-permeable membrane, leaving the colloidal material remaining in the sac. The type of membrane described as suitable for dialysis has been found also suitable for ultrafiltration.

In effecting ultracentrifiguration to remove the colloidal constituents from solution, a convention ultracentrifuge comprising a vertical, elongated, hollow, cylindrical centrifuge chamber rotatable about its longitudinal axis, having means for suitably adding thereinto and withdrawing therefrom liquids, may be satisfactorily utilized. When a plutonium solution containing contamination dispersed in colloidal form is ultracentrifuged, the colloidal particles migrate toward the periphery of the centrifuge bowl because their density is somewhat greater than that of the solution in which they are suspended. After a suitable period of ultracentrifugation, colloid-depleted solution containing ionic plutonium may be tapped from near the rotational axis of the ultracentrifuge bowl.

As would be expected, the more intense the centrifugally-produced gravitational field, the more rapid and complete is the separation of colloidal contaminants from plutonium. In this respect, centrifugal fields of the order of 40,000 to 50,000 times that of normal gravity have been found to be effective for practical separation of subject colloidal components, although stronger fields are preferable. The generation of centrifugal fields of this order may be accomplished, for example, by employing an ultra-centrifuge bowl approximately 4 to 5 centimeters in diameter rotating at about 50,000 revolutions per minute. One method of procedure found to be quite satisfactory is to cause the plutonium solution being separated to be ultra-centrifuged under such conditions for about an hour, whence the majority of the colloidal particles are forced to the metal walls of the centrifuge bowl and adhere thereto. Upon completion of the centrifugation the solution is decanted from the centrifuge bowl, leaving the bulk of the colloidal material adhering to the peripheral walls of the bowl. The colloidal material may be subsequently removed by suitable washing. The nature of ultracentrifugation makes it readily adapted to continuous operation. Such operation may be effected when utilizing apparatus of the type described, by the introduction of a slow, continuous stream of solution to be processed into the lower end of the centrifuge bowl, while continuously removing a similar volumetric amount of centrifugate from the upper end. Since the radiocolloidal material is ordinarily present in only minute concentrations, such continuous ultracentrifugation may advantageously proceed from extremely long periods before purging of the collected colloidal material becomes necessary.

The composition of the aqueous liquids treated by such procedures in accordance with the present invention may vary widely, provided the plutonium content is predominantly in an ionic form. In general, dilute, aqueous, acidic solutions, particularly nitric acid solutions, being particularly favorable to the spontaneous occurrence of plutonium in an ionic form, are preferred. It obtains that in a solution of neutron irradiated uranium, some portion of the contained fission products will satisfactorily be present in radiocolloidal form in all instances where the plutonium is present predominantly in ionic form. However, plutonium ions are known to undergo hydrolysis and polymerization to form themselves into molecular aggregates of colloidal size and properties, under certain conditions of acidity which must consequently be avoided to obtain the best results in applying the present invention. Such occurrence of plutonium in colloidal form frequently arises in solutions having a pH above about 4. The critical pH above which such colloidal plutonium occurrence becomes prevalent varies primarily with both the concentration and valence state of plutonium. Ordinarily, it does not occur with plutonium concentrations below $10^{-6}$ molar in the case of either tetravalent or hexavalent plutonium. Considering the approximate pH's above which plutonium colloidality becomes prevalent in aqueous nitric acid solutions as being generally representative of the effect, the following data are presented.

APPROXIMATE pH's ABOVE WHICH PLUTONIUM COLLOIDALITY BECOMES PREVALENT IN AQUEOUS NITRIC ACID SOLUTIONS

| Tetravalent | | Hexavalent | |
|---|---|---|---|
| Concentration | pH | Concentration | pH |
| $10^{-5}$ molar | 3 | $10^{-5}$ molar | 5¼ |
| $10^{-4}$ | 2½ | $10^{-4}$ | 4¾ |
| $10^{-3}$ | 2 | $10^{-3}$ | 4 |
| $10^{-2}$ | 1½ | $10^{-2}$ | 3½ |
| $10^{-1}$ | 1 | $10^{-1}$ | 3 |

Therefore, the acidity of solutions treated in accordance with the present invention ordinarily should be maintained such that the pH's are below those outlined above, in order to meet the requirement that the plutonium be predominantly in ionic form. It may be seen that the plutonium is preferably employed in the hexavalent state in order to take advantage of the wider permissible pH range.

The fission product radiocolloids have been noted to be characterized by their relatively small particle size (averaging roughly $10^{-6}$ centimeters in diameter) and stability in high concentrations of electrolyte. Evidence indicates that such radiocolloids spontaneously occur in solutions having any fission product concentration which would normally obtain in conventional carrier precipitation plutonium processing, ranging from extremely low concentrations up to concentrations where fission products precipitate from solution. However, the degree of radiocolloidality appears to increase with fission product concentration. It was also found that the proportion of fission product contamination present in radiocolloidal form tends to decrease with increasing acidity; it is therefore preferred that the pH be as high as possible without incurring deleterious plutonium polymerization. Balancing the two conflicting pH desiderata, operation is preferably conducted with solutions of fractional molarity in plutonium, having pH's within the approximate range 0 to 4.

It has been found that in general the present process is of universal applicability to aqueous fission-product-contaminated, ionic-plutonium-containing liquids arising in the conventional processing of neutron-irradiated uranium for plutonium recovery. For example, when applied to conventional bismuth phosphate carrier precipitation for the purpose, the present process has proven to be efficacious in removing troublesome radiocolloidal contaminants at all points in the product precipitation—by-product precipitation cycle; specific data are given in the following Example I.

EXAMPLE I

Several rods of natural uranium metal which had undergone a chain uranium fission reaction for a sufficient period to transmit 0.00025% thereof to $_{93}Np^{239}+_{94}Pu^{239}$ were stored for 100 days after termination of the reaction to permit radioactive decay. The estimated content of plutonium, neptunium, and the more concentrated fission product species in the 100-day stored uranium is tabulated in Table I below.

Table I

| Element | Grams Per Gram of Neutron-Irradiated Uranium |
|---|---|
| Pu | $248 \times 10^{-9}$ |
| Np | $2.5 \times 10^{-6}$ |
| Xe | $29.5 \times 10^{-8}$ |
| Cs | $28.8 \times 10^{-8}$ |
| Ce | $28.5 \times 10^{-8}$ |
| Nd | $28.5 \times 10^{-8}$ |
| Zr | $26.3 \times 10^{-8}$ |
| Mo | $21.6 \times 10^{-8}$ |
| Ru | $13.9 \times 10^{-8}$ |
| Pr | $12.9 \times 10^{-8}$ |
| Cb | $12.6 \times 10^{-8}$ |
| Ba | $10.9 \times 10^{-8}$ |
| Sr | $10.4 \times 10^{-8}$ |
| La | $8.4 \times 10^{-8}$ |

The relative proportions of fission products and plutonium shown are typical of those generally occurring in neutron-irradiated uranium. Most of the fission product products emit both beta and gamma radiation. The estimated distribution of the gamma activity, for instance, in the neutron-irradiated mass is tabulated in Table II below.

Table II

DISTRIBUTION OF EFFECTIVE GAMMA ACTIVITY FOR FISSION ELEMENTS AS PERCENTAGE OF TOTAL

| | |
|---|---|
| Cb | 40 |
| Zr | 26 |
| Ce | 10 |
| Ru | 8.6 |
| Sr | 4.8 |
| La | 2.3 |
| Y | 2.3 |
| Others | ~6 |

The 100-day stored uranium was processed through one complete cycle of conventional bismuth phosphate oxidation-reduction carrier precipitation by the following steps:

(a) Uranium mass dissolved in stoichiometric amount of 13 N $HNO_3$, then diluted with water to form a 31.4% uranyl nitrate solution.

(b) Solution made 1 M in $H_2SO_4$, 0.1 M in $NaNO_2$, then diluted with water to twice its volume, and heated to 75° C., to reduce Pu to tetravalent state.

(c) 2.5 grams/liter of $Bi^{+++}$ added; $H_3PO_4$ added to 0.6 M over a period of 2 hours; digested 1 hour at 75° C.; then the formed $BiPO_4$ carrier product precipitate was separated from supernatant by filtration; dissolved in 13 N $HNO_3$; and diluted with water to 5 N acid.

(d) Excess $NaBiO_3$ and $Na_2Cr_2O_7$ added for Pu oxidation at 50° C.; solution diluted to 1.3 N $HNO_3$; 50 mg./1 $Bi^{+++}$ added; $BiPO_4$ by-product precipitate precipitated by adding $H_3PO_4$ to 0.0092 M; by-product precipitate removed by filtration, leaving Pu-containing supernatant.

A portion of the liquid formed by each of the above steps was withdrawn and subjected to dialysis in accordance with the present invention, employing apparatus essentially similar to that illustrated in the appended drawing. For simplification of analysis, the total amount of second solution employed was contained in tank throughout the entire run, no flow thereof into or out of the tank being employed. In each case the solution was dialyzed against a uranium solution identical in composition excepting containing no plutonium, neptunium, or fission products. The semi-permeable membrane comprised a seamless parchment bag; the dialysis was conducted at 50° C. After 24 hours the dialysis liquids were radiometrically analysed, and the dialyzable percentages of the initial constituents were calculated therefrom in the usual manner; the results are presented in Table II.

Table II

| Solution From Step | Percent of Initial Gross Gamma Activity Found Non-Dialyzable | Percent of Initial Plutonium Found Dialyzable |
| --- | --- | --- |
| A | 28 | 97 |
| B | 23 | 100 |
| C | 95 | 99 |
| D | 28 | 100 |

As may be observed from the results, while in each instance plutonium was substantially completely dialyzable under the conditions employed, a considerable portion of the contaminating fission products, as gauged by the gamma activity, was found to be non-dialyzable and thus separable from plutonium. A marked effect of pre-treatment of the liquid by effecting a bismuth phosphate precipitation therein to enhance the degree of fission product radiocolloidality is evidenced by the almost complete removal of gamma activity which is effectible on solution "C," the dissolved bismuth phosphate product precipitate. It is therefore preferable to use such a pre-treatment of the liquid before conducting the present process.

Further observation has revealed that the radiocolloidal contaminants are those primarily responsible for the low decontamination efficiency associated with conventional carrier precipitation procedures for the isolation of plutonium. It appears that during carrier precipitation, part of the radiocolloidal material is removed from the plutonium solution supposedly by physical occlusion of the colloidal particles in the flocculent precipitate. However, because it is so removed neither especially well nor especially poorly, its removal in this manner seriously detracts from the decontamination efficiency of both product and by-product precipitations. Therefore, this process is effective in the removal of those contaminants which conventional carrier plutonium decontamination procedures are inept at removing; its combination with conventional carrier precipitation processing, particularly immediately preceding product and by-product carrier precipitations, results in an overall process of unusually high plutonium decontamination efficiency. Since the present process involves merely a mechanical removal operation which does not ordinarily require any change in conditions in solutions arising in conventional plutonium carrier precipitation procedures, it may simply be effected at a plurality of points in such procedures without disrupting the usual course of operation.

It was found that the particular fission product species which exhibit radiocolloidality primarily comprise columbium, zirconium, and, to a lesser extent, barium, and lanthanum. In illustration, it was found that in the dialysis effected upon solution C described in Example I, the percentages of these particular species found dialyzable were as follows in Table III.

Table III

PERCENTAGE OF PARTICULAR FISSION PRODUCT SPECIES FOUND DIALYZABLE IN DIALYSIS OF SOLUTION "C" IN EXAMPLE I

Species: Percent dialyzed
Cb _____ 3
Zr _____ 1
La _____ 40
Ba _____ 53

Investigating the radiocolloidal properties of these particular fission product species in detail, it was found that the presence of certain reagents markedly effects the degree of radiocolloidality of the individual species. The percentage in non-dialyzable radio-colloidal form of each of the four species has been noted to decrease with increasing acidity. The percentages of zirconium and columbium are decreased to a great extent by the presence of oxalic acid, and even more so by fluosilicic acid. On the other hand, the radiocolloidality of lanthanum is considerably enhanced by the presence of oxalic or fluosilicic acid. Sulfate ion decreases the non-dialyzable proportion of columbium, but has little effect on zirconium. Phosphate ion and nitrate ion increase the proportion, especially that of zirconium. The magnitude of the effects of these additive reagents may be observed in the results of the following Examples II and III.

In Examples II and III, the effects of added reagents on the radiocolloidality of individual fission product species are determined. In order to accurately assess the effects of the agents in each individual fission product species, and to demonstrate that the radiocolloidal properties obtain generally, rather than peculiarly to solutions of neutron-irradiated uranium, synthetic solutions each containing only one fission product species were employed. In Example II the synthetic solutions were substantially identical in uranium and particular fission product content with those which would normally be obtained by nitric acid dissolution of neutron-irradiated uranium.

EXAMPLE II

A. 0.48 molar uranyl nitrate solution (non-irradiated) was divided into two portions. To each portion was added a different isolated radioactive fission product species in the form of a nitrate "solution" thereof. The first portion was thus made approximately $1\times10^{-4}$ in $Zr^{95}$, and the second approximately $5\times10^{-5}$ molar in $Cb^{95}$. A number of equal quantities of each solution portion were successively subject to dialysis using apparatus, procedure, and conditions the same is in Example I. Various reagents, as noted, were added to the solution before dialysis. The results are tabulated in Table IV below.

Table IV

DIALYSIS OF $Zr^{95}$ AND $Cb^{95}$ IN URANYL NITRATE SOLUTION

| Composition of Solution, Moles/Liter | | | | | Percent Dialyzed | |
| --- | --- | --- | --- | --- | --- | --- |
| $UO_2(NO_3)_2$ | $HNO_3$ | $H_2SO_4$ | $Na_2SO_4$ | $NaNO_3$ | Radio-zirconium | Radio-columbium |
| 0.48 | 0 | 0 | 0 | 0 | 27 | 20 |
| 0.48 | 0 | 0.5 | 0 | 0 | 95 | 72 |
| 0.48 | 0 | 0 | 0.5 | 0 | 16 | 67 |
| 0.48 | 0.5 | 0 | 0 | 0 | 60 | 70 |
| 0.48 | 0 | 0 | 0 | 0.5 | 14 | 20 |

In Example III, the effects of other reagents are assessed, while further demonstrating that the radiocolloidal properties are independent of the presence of uranium.

EXAMPLE III

To equal quantities of aqueous solutions of various reagents as noted, were added an individual isolated radioactive fission product species, as in Example II. In each case the solutions were made either approximately $1\times10^{-5}$ molar in $Zr^{95}$, $5\times10^{-5}$ molar in $Cb^{95}$, or $2\times10^{-5}$ molar in $La^{140}$. Each quantity of solution so prepared was dialyzed against a solution of identical composition, excepting containing no fission product species. The apparatus, procedure, and conditions were the same as in the previous examples. The results are tabulated in Table V below.

*Table V*

EFFECTS OF REAGENTS ON FISSION PRODUCT DIALYSIS

| Reagent | Concentration, Moles/Liter | Percent Dialyzing | | |
|---|---|---|---|---|
| | | $Zr^{95}$ | $Cb^{95}$ | $La^{140}$ |
| $H_2O$ | | | | 90 |
| HCl | 0.01 | 25 | 19 | |
| $HNO_3$ | 1.0 | | 67 | 92 |
| $H_3PO_4$ | 0.1 | 43 | 67 | 85 |
| $H_2SiF_6$ | 0.1 | 94 | 90 | 60 |
| $H_2C_2O_4$ | 0.1 | 43 | 73 | 24 |

From the results obtained in Examples II and III, it becomes apparent that the presence of certain of the reagents, for example fluosilicic acid, should be avoided for best results in applying the present invention to decontamination of plutonium, while the decontamination efficiency may be improved, if desired, by adding certain other of the reagents, for example sulfate or nitrate ions in a form which will not increase acidity, such as in the form of sodium or potassium salts thereof. Furthermore, since certain reagents have a much more pronounced effect on one species than on another, this effect may be utilized in the fractional recovery of individual fission species. For example, referring to Table IV, it may be observed that columbium and then zirconium may be preferentially recovered from a nitrate solution of neutron-irradiated uranium, under the general concentration conditions used in Example II, say an aqueous nitric acid solution of fractional molarity in uranium and having a pH higher than 0, by first adding sulfuric acid to the solution to make the solution of fractional molarity therein, and dialyzing or ultrafiltering, whence the radiocolloidal material separated will comprise predominantly radiocolumbium. Then the sulfuric acid content of the dialyzate is neutralized with sodium hydroxide and a second dialysis is effected, whereupon the radiocolloidal material separated will then comprise predominantly radiozirconium. Such a process is of considerable advantage, in that when so applied it combines the functions of decontaminating plutonium of these materials and of serving simultaneously as the first step in the partition and isolation of these fission species, which constitute valuable plutonium production by-products. Other similar procedures for fractionating fission species, which take advantage of the selective action of different reagents toward different fission species, will be apparent to those skilled in the art from the results set forth in Examples II and III.

Rapidity, avoidance of dilution, and eminent suitability for continuous operation make ultracentrifugation the preferred procedure for production scale applications of the present invention. In general, the effectiveness of ultracentrifugation increases approximately with the square rots of both the applied centrifugal force and the time of centrifugation. Thus, the greater the applied centrifugal force, the greater the effectiveness of centrifugation of the same duration or the shorter the duration of centrifugation required for the same effectiveness. Generally speaking, any of the procedures, and apparatus, customary in the art for removing colloidal particles as small as approximately 50 Angstrom units in diameter from aqueous suspension are satisfactory for the present purpose. For instance, it has been found that quite satisfactory results may be obtained in about half hour when applying a centrifugal field equivalent to approximately 50,000 times that of normal gravity. Greater centrifugal fields than this are, of course, highly desirable, although somewhat smaller fields of longer duration are also effective. The following Example IV is illustrative of an application of ultracentrifugation for effecting removal of radiocolloidal fission products in accordance with the present invention. The ultracentrifugation was conducted by passing a stream of nitrate solution of neutron-irradiated uranium through a commercial supercentrifuge, while utilizing a precise radiometric analysis for radiocolumbium throughout the run as a simplified basis for assessing the efficacy of the operation.

EXAMPLE IV

Ten milliliters of a 25-day old 31.4% by weight aqueous uranyl nitrate solution was obtained from the aqueous nitric acid dissolution of natural uranium metal which had been neutron-irradiated for a sufficient period to transmute approximately 0.02% by weight to plutonium and about an equal weight to fission products, and had then been stored for 60 days. This limited, available amount of solution was diluted to one liter with a 15.8% by weight solution of unirradiated uranyl nitrate, in order that it would be of sufficient volume for the run. Analysis of the resulting solution indicated that 44% of the total gamma activity comprised radiocolumbium. The solution was continuously fed at a rate of 2.0 milliliters per minute into the lower end of a vertical, elongated, cylindrical ultra-centrifuge bowl having an inside diameter of 4.444 centimeters and rotating at 50,000 revolutions per minute. About 90 minutes after the start of feed introduction, centrifugate solution began to flow from a centrifugate outlet orifice disposed in the upper end of the centrifuge bowl and arranged to permit the efflux of any amount of liquid at the top of the bowl in excess of that which would leave a vortex 2.418 cm. in diameter. Twenty minutes after completion of feed addition, the centrifuge bowl was stopped, and the centrifugate and the "hold-up" solution remaining in the bowl were analyzed for radiocolumbium. The results obtained are presented in Table VI below.

*Table VI*

CENTRIFUGATION OF NITRATE SOLUTION OF NEUTRON-IRRADIATED-URANIUM

| Centrifuge Fraction | Percent of Initial Radiocolumbium Concentration Found in Centrifuge Fraction |
|---|---|
| Initial solution | 100 |
| Centrifugate | 51 |
| Hold-Up | 57 |

It may be observed that when the hold-up was drained from the centrifuge bowl, it did not contain the bulk of the removed radiocolumbium. Investigation revealed that the removed radiocolumbium was adhering to the walls of the centrifuge bowl. The precisely measured radiocolumbium removal serves as an index to the order to removal of the other radiocolloidal fission species. A cursory analysis indicated that the centrifugate was also depleted in radiozirconium, and radiolanthanum, as could be expected from the results obtained in the dialysis runs in the preceding examples.

Generally speaking, it has been noted that the degree of radiocolloidality of the fission products progressively increases as the pH is raised. This phenomenon, together with the hereinbefore discussed fact that plutonium itself becomes colloidal when the acidity is sufficiently decreased, serves as the basis for the mechanism of another important aspect of the present invention. In accordance with this aspect, the present invention provides a novel method for the decontamination and recovery of plutonium values, as well as the separate recovery of by-product fission product values, from an aqueous acidic liquid containing plutonium predominantly in ionic form and having the fission products dispersed therein, which comprises subjecting said liquid successively to a plurality of processing stages each comprising a process for separating and removing suspended colloidal material therefrom, while maintaining the pH of the liquid at a progressively incrementally increased level in each successive stage after the first, with the pH so maintained in a later stage being sufficiently high to render colloidal the plutonium content present, thereby separating and removing fission product values, as radiocolloid, from the liquid in at least the first stage, also thereby separating plutonium values, as colloid, from the liquid in said later stage, and thereafter separately recovering fission product values so removed in the first stage and plutonium values so removed in said later stage In this manner plutonium is effectively separated both from the fission product radiocolloids which form at a pH lower, and from the radiocolloids which form at a pH higher than that at which plutonium becomes colloidal. Such a process constitutes a new and advantageous independent general method for the processing of neutron-irradiated uranium solution for the decontamination, concentration and recovery of plutonium and separate recovery of valuable by-product fission species. A convenient method for effecting the process in a continuous manner comprises passing a stream of neutron-irradiated uranium through a series of ultra-centrifuges, while raising the pH say a half or a whole pH unit between each centrifuge. After a suitable period the operation is stopped, and the centrifuge containing colloidal plutonium is washed with a nitric acid solution to remove the plutonium. If the level of contamination accompanying the removed plutonium is still higher than desired, the acidity of the solution of removed plutonium may be raised to reconvert plutonium to predominantly an ionic form, and the series ultracentrifugation may be repeated, raising the pH by a smaller increment between each centrifuge to obtain more finely fractionated cuts. The process is also adaptable to the use of different colloid separation processes throughout the series to afford greater convenience and efficiency. For instance, an ultrafiltration step may be employed at the point where plutonium becomes colloidal to afford greater plutonium concentration, with simpler ultracentrifugation being used throughout the remainder of the series.

The following Example V is illustrative of the above-described aspect of this invention.

EXAMPLE V

A uranyl nitrate solution prepared by aqueous nitric acid dissolution of neutron-irradiated uranium, being 1.5 molar in uranium and $1 \times 10^{-3}$ molar in plutonium, and having a pH of 0.5, is subjected to successive ultracentrifugations by passing a continuous stream thereof through a series of ultracentrifuges. Each ultracentrifugation is effected with an average applied centrifugal field of 50,000 times that of normal gravity, and a given portion of the solution remains in each centrifuge for approximately one hour. Between each centrifugation the pH of the stream is raised by NaOH addition. The pH's used in each successive centrifuge are: 0.5, 1.5, 2.5, 3.5, and 4.5. After each pH adjustment, the solution is held for about one hour to permit colloid formation at the new pH before effecting ultracentrifugation. In the first centrifuge, roughly 20-25% of the gamma activity comprising predominantly radiocolumbium and radiozirconium is removed. In the second centrifuge, a smaller amount of primarily gamma activity is removed. In the third centrifuge a substantial portion of the plutonium is separated, with a lesser additional amount being separated in the fourth centrifuge. The fifth ultracentrifugation effects further fission product removal; the separated radiocolloid comprises beta and gamma radioactivity. After completion of the run, each ultracentrifuge bowl is separately purged with 10 N $HNO_3$ to wash out the collected materials.

While the present invention has been described with particular emphasis to its application to plutonium production, it is also applicable to the fractionation of fission species from aqueous systems containing substantially no uranium or plutonium. Such solutions obtain as otherwise waste solutions discharged from the processing of neutron-irradiated uranium wherein substantially all plutonium and uranium is removed by various conventional operations. The present process may be beneficially applied to such fission product solutions for recovery of radiocolumbium and radiozirconium, which are valuable because of their radioactivity. Employing the described aspect of using additive agents to enhance the fractionation of individual fission species is of particular advantage in such application.

Furthermore, since it has been noted that the radiocolloidality of the particular fission species involved is a characteristic of the particular species themselves, thought to be attributable to their radioactivity, and is not restricted to instances where they are produced by fission, the present process may also be applied to the recovery of those radioisotopes when produced by means other than fission. For instance, this process may be profitably applied to the concentration and recovery, from aqueous liquids, of individual radioisotopes, such as $Cb^{95}$ and $Zr^{95}$, produced by cyclotron bombardment of natural materials.

It is to be understood that all matter contained in the above description and examples shall be interpreted as illustrative and not limitative of the scope of this invention, as it is intended to claim the present invention as broadly as possible in view of the prior art.

What is claimed is:

1. In a process for the separation and recovery of plutonium values from an aqueous liquid comprising plutonium predominantly in ionic form together with uranium fission products, the concentration of said fission products being less than approximately $1 \times 10^{-4}$ molar, the step of subjecting said liquid to a process for separating and removing suspended colloidal material therefrom while maintaining said liquid at a pH within the range of 0 to 4, thereby separating and removing contaminating fission products, as radiocolloid, from the plutonium-containing liquid.

2. In a process for the separation and recovery of plutonium values from an aqueous liquid comprising plutonium predominantly in ionic form together with uranium fission products, the concentration of said fission products being less than approximately $1 \times 10^{-4}$ molar, the step of subjecting said liquid to a process for separating and removing suspended colloidal material therefrom by dialysis while maintaining said liquid at a pH within the range of 0 to 4, thereby separating and removing contaminating fission products, as radiocolloid, from the plutonium-containing liquid.

3. In a process for the separation and recovery of plutonium values from an aqueous liquid comprising plutonium predominantly in ionic form together with uranium fission products, the concentration of said fission products being less than approximately $1 \times 10^{-4}$ molar, the step of subjecting said liquid to a process for separating and removing suspended colloidal material therefrom by ultracentrifugation while maintaining said liquid at a pH within the range of 0 to 4, thereby separating and removing contaminating fission products, as radiocolloid, from the plutonium-containing liquid.

4. In a process for the separation and recovery of plutonium values from an aqueous liquid comprising plutonium predominantly in ionic form together with fission products, the concentration of said fission products being less than approximately $1 \times 10^{-4}$ molar, the step of subjecting said liquid to a process for separating and removing suspended colloidal material therefrom by ultrafiltration while maintaining said liquid at a pH within the range of 0 to 4, thereby separating and removing contaminating fission products, as radiocolloid, from the plutonium-containing liquid.

5. In a process for the separation and recovery of plutonium values from an aqueous nitric acid solution having a pH within the range of 0 to 4, comprising plutonium predominantly in ionic form and in fractional molarity, together with uranium fission products, the concentration of said fission products being less than approximately $1 \times 10^{-4}$ molar, the step which comprises subjecting said solution to a process for separating and removing therefrom suspended colloidal particles larger than approximately 50 Angstrom units in diameter, thereby separating and removing contaminating fission products, as radiocolloid, from the plutonium-containing liquid.

6. In a process for the separation and recovery of plutonium values from an aqueous liquid comprising plutonium predominantly in ionic form together with at least one of the radioactive species of the group consisting of radiocolumbium, radiozirconium, radiolanthanum, and radiobarium, said radioactive species being present in a concentration less than approximately $1 \times 10^{-4}$ molar, the step of subjecting said liquid to a process for separating and removing therefrom suspended colloidal particles larger than approximately 50 Angstrom units in diameter while maintaining said liquid at a pH within the range of 0 to 4, thereby separating and removing said radioactive species, as radiocolloid, from the plutonium-containing liquid.

7. In a process for the decontamination and recovery of plutonium values from an aqueous liquid comprising plutonium values and contamination including uranium fission products, the concentration of said fission products being less than approximately $1 \times 10^{-4}$ molar, comprising the preferential carrier precipitation of plutonium values from said liquid, the improvement step which comprises subjecting said liquid, prior to effecting said carrier precipitation therein and while maintaining its plutonium content predominantly in ionic form and its pH within the range of 0 to 4, to a process for separating and removing suspended colloidal material therefrom, thereby separating and removing contaminating fission products, as radiocolloid, from the plutonium-containing liquid.

8. In a process for the decontamination and recovery of plutonium values from an acidic, aqueous liquid comprising plutonium values and contamination including uranium fission products, the concentration of said fission products being less than approximately $1 \times 10^{-4}$ molar, the improvement steps which comprise, in combination, precipitating bismuth phosphate in said liquid while maintaining the plutonium in tetravalent state, thereby carrying plutonium values from solution therewith, dissolving the resulting plutonium-containing bismuth phosphate precipitate to form an aqueous liquid containing plutonium predominantly in ionic form, and thereupon subjecting said liquid to a process for separating and removing suspended colloidal material therefrom while said liquid is maintained at a pH within the range of 0 to 4, thereby removing from the plutonium-containing liquid, as radiocolloid, contaminating fission products which had accompanied plutonium in the carrier precipitation step.

9. In a process for the decontamination and recovery of plutonium values from an initial acidic aqueous liquid comprising plutonium values and contamination including uranium fission products, the concentration of said fission products being less than approximately $1 \times 10^{-4}$ molar, which comprises alternately effecting, while maintaining plutonium in tetravalent state, preferential carrier precipitation of plutonium from an aqueous acidic liquid derived from said initial liquid, by precipitating bismuth phosphate therein, and effecting, while maintaining plutonium in dissolved hexavalent state, preferential carrier precipitation of contaminants away from plutonium from an aqueous, acidic liquid derived by dissolution of the aforesaid plutonium-containing bismuth phosphate precipitate, by precipitating bismuth phosphate therein, the supplemental improvement step which comprises subjecting one of the aforesaid liquids, while maintaining its plutonium content predominantly in ionic form and its pH within the range of 0 to 4, to a process for separating and removing suspended colloidal material therefrom, thereby separating and removing contaminating fission products, as radiocolloid, from the plutonium-containing liquid.

10. In a process for the decontamination and recovery of plutonium values from an initial aqueous liquid comprising plutonium values and contamination including uranium fission products, the concentration of said fission products being less than approximately $1 \times 10^{-4}$ molar, which comprises alternately effecting, while maintaining plutonium in tetravalent state, preferential carrier precipitation of plutonium from an aqueous acidic liquid derived from said initial liquid, by precipitating bismuth phosphate therein, and effecting, while maintaining plutonium in dissolved hexavalent state, preferential carrier precipitation of contaminants away from plutonium from an aqueous acidic liquid derived by dissolution of the aforesaid plutonium-containing bismuth phosphate precipitate, by precipitating bismuth phosphate therein, the supplemental improvement step which comprises subjecting one of the aforesaid liquids, while maintaining its plutonium content predominantly in ionic form and its pH within the range of 0 to 4, to ultracentrifugation by exerting thereupon a centrifugal force at least 40,000 times that of gravity for at least one half hour for removing suspended colloidal material therefrom, thereby separating and removing contaminating fission products, as radiocolloid, from the plutonium-containing liquid.

11. In a process for the decontamination and recovery of plutonium values from an aqueous nitric acid solution having a pH within the range of 0 to 4, comprising plutonium predominantly in ionic form together with contaminating fission products including radiocolumbium and radiozirconium values the concentration of said fission products being less than approximately $1 \times 10^{-4}$ molar, the plutonium decontamination steps for separately preferentially removing and recovering radiocolumbium and thereafter radiozirconium values from said solution which comprises adding sulfuric acid thereto to make said solution of fractional molarity therein, thereupon subjecting said solution to a process for separating and removing suspended colloidal material therefrom, thereby removing and recovering therefrom, as radiocolloid, radiocolumbium values, then neutralizing the added sulfuric acid content of the resulting radiocolumbium-depleted solution with sodium hydroxide, and thereupon subjecting the resulting solution to a process for separating and removing suspended colloidal material therefrom, thereby removing and recovering therefrom, as radiocolloid, radiozirconium values.

12. In a method for the decontamination and recovery of plutonium values, and the separate recovery of uranium fission product values from an aqueous acidic liquid comprising plutonium predominantly in ionic form together with uranium fission products, the concentration of said fission products being less than approximately $1 \times 10^{-4}$ molar, the steps which comprise subjecting said liquid successively to a plurality of processing steps each comprising a process for separating and removing suspended colloidal material therefrom, while maintaining the pH of the liquid in the first step within the range 0 to 4 and in the subsequent steps at a progressively increased level reaching a pH above 4 in at least the last of said subsequent steps, thereby separating and removing fission product values, as radiocolloid, from said liquid in at least the first step, and also thereby separating plutonium values, as colloid, from said liquid in said last step.

References Cited in the file of this patent

UNITED STATES PATENTS 2,785,951    Thompson et al.  --------  Mar. 19, 1957

OTHER REFERENCES

Physical Review, vol. 65 (1944), page 61; vol. 60 (1941), page 425.

Journal of Chemical Physics, vol. 13 (1945), pages 208–216.

Hackh's Chemical Dictionary, 3rd ed., pages 264, 878 (1944), publ. by The Blakiston Co., Philadelphia.

Yagoda: "Radioactive Measurements with Nuclear Emulsions," John Wiley & Sons (1949). Received in Scientific Library July 18, 1949. Pages 153–159.

Freundlich: "Colloid and Capillary Chemistry," pages 220–222, 818, 819 (1922), E. P. Dutton & Co., New York.

Weiser: "The Hydrous Oxides," pages 237–240 (1926), publ. by McGraw-Hill Book Co., New York.

Britton: "Hydrogen Ions," page 278 (1929), publ. by D. Van. Nostrand Co., New York.

Hahn: "Applied Radiochemistry," Cornell Univ. Press (1936), pages 51–62.

Seaborg et al.: "The Transuranium Elements," Part I (NNES IV–14B), McGraw-Hill Book Co., N.Y. (1949), pages 443–4.